US012554216B2

(12) United States Patent
Izumichi

(10) Patent No.: US 12,554,216 B2
(45) Date of Patent: Feb. 17, 2026

(54) FIXING DEVICE WHICH PREVENTS ECCENTRIC CAM THAT PERFORMS RECIPROCATING ROTATION FROM ROTATING EXCESSIVELY, AND IMAGE FORMING APPARATUS

(71) Applicant: KYOCERA Document Solutions Inc., Osaka (JP)

(72) Inventor: Sachio Izumichi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/783,791

(22) Filed: Jul. 25, 2024

(65) Prior Publication Data

US 2025/0036050 A1 Jan. 30, 2025

(30) Foreign Application Priority Data

Jul. 28, 2023 (JP) ................................ 2023-123424

(51) Int. Cl.
*G03G 15/20* (2006.01)

(52) U.S. Cl.
CPC ..... *G03G 15/2028* (2013.01); *G03G 15/2064* (2013.01)

(58) Field of Classification Search
None
See application file for complete search history.

(56) References Cited

U.S. PATENT DOCUMENTS 3,398,259 A * 8/1968 Tregay .................. G03G 15/28 219/486
5,323,944 A * 6/1994 Faust ................ G03G 15/2028 226/15
6,035,160 A * 3/2000 Kim .................. G03G 15/2032 399/331

(Continued)

FOREIGN PATENT DOCUMENTS

JP 2017107034 A 6/2017

OTHER PUBLICATIONS

Rack Strike Elements (2018) (available at https://mb.nawcc.org/wiki/Encyclopedia-Subjects/Clock-Repair/Rack-Strike-Elements, retrieved Oct. 17, 2025).*

*Primary Examiner* — Sevan A Aydin
(74) *Attorney, Agent, or Firm* — Alleman Hall LLP

(57) ABSTRACT

A fixing device includes a pressure changing portion which makes a switch between a pressurized state where a pressure region is pressurized and a depressurized state where the pressure region is depressurized. The pressure changing portion includes a support portion, an eccentric cam, and a restriction portion. The support portion moves within a range corresponding to the pressurized state and the depressurized state. The eccentric cam performs a reciprocating rotation while being in contact with or opposing a cam follower. The restriction portion restricts a rotation exceeding a reciprocating rotation range of the eccentric cam. The eccentric cam includes a pressure surface portion and a depressurization surface portion. The restriction portion interferes with a part of the support portion in a state where the pressure surface portion or the depressurization surface portion is in contact with or opposes the cam follower to restrict a rotation of the eccentric cam.

7 Claims, 11 Drawing Sheets

(56) References Cited

U.S. PATENT DOCUMENTS

| | | | | |
|---|---|---|---|---|
| 2009/0148173 | A1* | 6/2009 | Tajima | G03G 21/00 399/36 |
| 2014/0270875 | A1* | 9/2014 | Mimbu | G03G 15/2035 399/329 |
| 2017/0168439 | A1 | 6/2017 | Miki | |
| 2017/0248884 | A1* | 8/2017 | Watanabe | G03G 15/2064 |
| 2019/0094769 | A1* | 3/2019 | Shinoya | G03G 15/2032 |
| 2020/0101688 | A1* | 4/2020 | Takahashi | B65H 31/3081 |
| 2020/0117129 | A1* | 4/2020 | Tsukamoto | G03G 15/6529 |
| 2020/0244135 | A1* | 7/2020 | Sakamoto | G03G 15/80 |
| 2024/0019803 | A1* | 1/2024 | Takagi | G03G 21/168 |
| 2024/0255894 | A1* | 8/2024 | Ota | G03G 21/1857 |

* cited by examiner

FIXING DEVICE WHICH PREVENTS ECCENTRIC CAM THAT PERFORMS RECIPROCATING ROTATION FROM ROTATING EXCESSIVELY, AND IMAGE FORMING APPARATUS

INCORPORATION BY REFERENCE

This application is based upon and claims the benefit of priority from the corresponding Japanese Patent Application No. 2023-123424 filed on Jul. 28, 2023, the entire contents of which are incorporated herein by reference.

BACKGROUND

The present disclosure relates to a fixing device and an image forming apparatus.

There is known a fixing device including a pressure mechanism which applies a nip pressure between a heating member and a pressure member and a pressure adjustment mechanism which varies the nip pressure. The pressure adjustment mechanism includes an eccentric cam whose distance from a rotation center to an outer circumferential surface changes in a circumferential direction, the eccentric cam performs forward reverse rotations (reciprocating rotations), a nip pressure is applied by the pressure mechanism at a large diameter portion formed on the outer circumferential surface, and the nip pressure is released at a small diameter portion. When the nip pressure is applied using the large diameter portion of the eccentric cam, a reactive force that causes the eccentric cam to rotate in a direction of the small diameter portion constantly acts on the eccentric cam.

SUMMARY

A fixing device includes a fixing member, a pressure member, and a pressure changing portion. The fixing member heats toner on a medium while rotating about a shaft. The pressure member forms a pressure region between the pressure member and the fixing member while rotating about a shaft and pressurizes the toner on the medium that passes through the pressure region. The pressure changing portion is configured to be capable of making a switch between a pressurized state where either one of the fixing member and the pressure member is pressed against another one of the fixing member and the pressure member to pressurize the pressure region and a depressurized state where the pressing of the either one of the fixing member and the pressure member is released to depressurize the pressure region. The pressure changing portion includes a support portion, an eccentric cam, and a restriction portion. The support portion rotatably supports either one of the fixing member and the pressure member and moves within a range corresponding to the pressurized state and the depressurized state. The eccentric cam performs a reciprocating rotation about a shaft while an outer circumferential surface thereof is in contact with or opposes a cam follower provided in the support portion. The restriction portion is provided in the eccentric cam and restricts a rotation exceeding a reciprocating rotation range of the eccentric cam. The eccentric cam includes a pressure surface portion and a depressurization surface portion. The pressure surface portion is formed at an end portion on one side of the reciprocating rotation range on the outer circumferential surface and sets the pressure region to the pressurized state. The depressurization surface portion is formed at an end portion on another side of the reciprocating rotation range on the outer circumferential surface and sets the pressure region to the depressurized state. The restriction portion interferes with a part of the support portion in a state where the pressure surface portion is in contact with or opposes the cam follower to restrict a rotation of the eccentric cam toward the one side of the reciprocating rotation range, and interferes with a part of the support portion in a state where the depressurization surface portion is in contact with or opposes the cam follower to restrict a rotation of the eccentric cam toward the another side of the reciprocating rotation range.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that Fr, Rr, L, R, U, and D shown in the figures respectively indicate front, rear, left, right, up, and down. Although the terms indicating directions and positions are used in the present specification, those terms are merely used for convenience of descriptions and do not limit the technical scope of the present disclosure.

Figure 1:
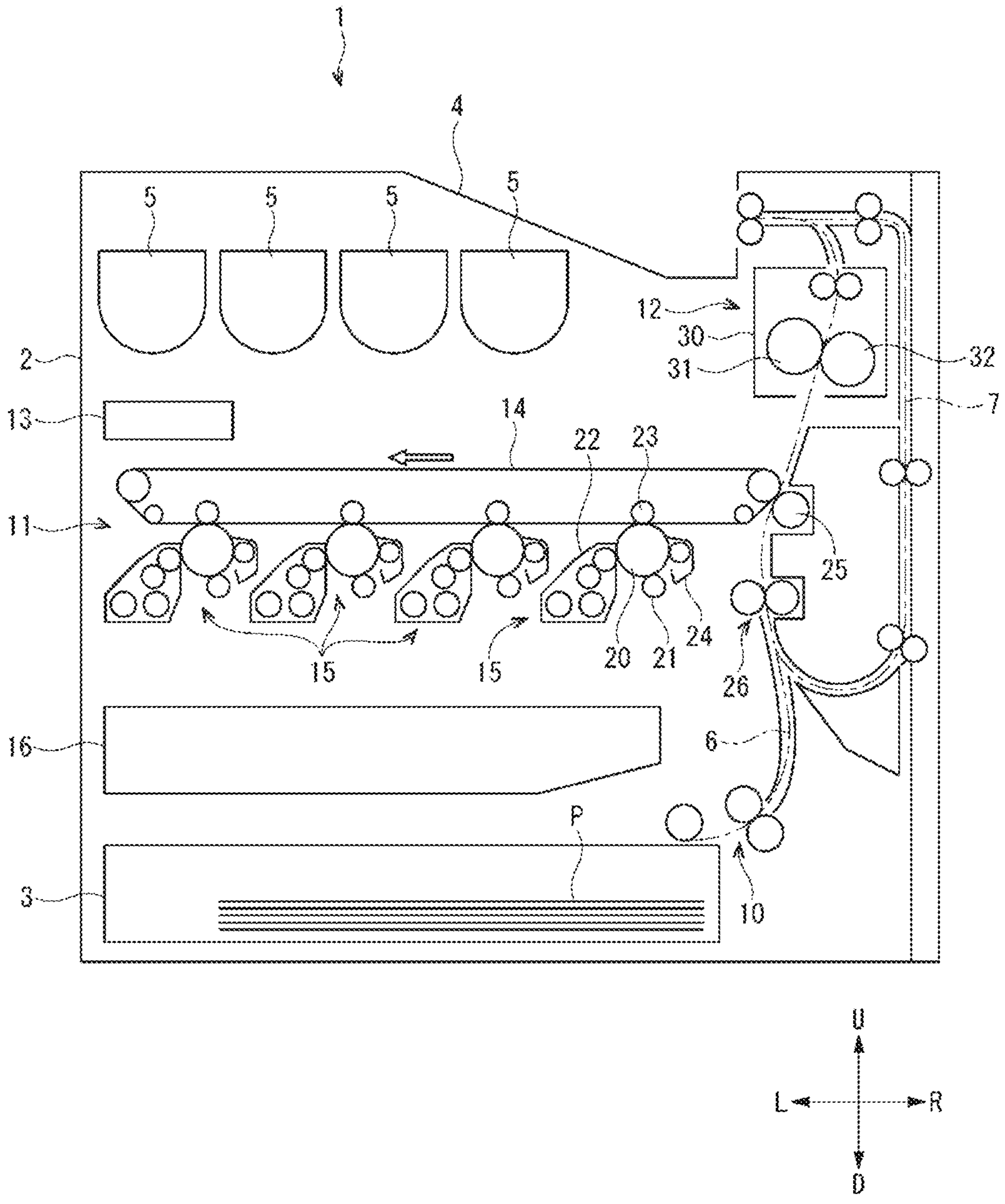
FIG. 1 is a cross-sectional view (a front view) showing a general outline of an internal portion of an image forming apparatus according to an embodiment of the present disclosure.

An image forming apparatus 1 according to the embodiment will be described with reference to FIG. 1. FIG. 1 is a cross-sectional view (a front view) showing a general outline of an internal portion of the image forming apparatus 1.

[Image Forming Apparatus]

The image forming apparatus 1 is a color printer which forms an image by transferring a full-color toner image formed by electrophotography onto a paper sheet P (a medium). The image forming apparatus 1 includes an apparatus body 2 which configures an exterior having substantially a rectangular parallelepiped shape. A cassette 3 which stores the paper sheets P is detachably provided at a lower portion of the apparatus body 2, and a sheet discharge tray 4 onto which the paper sheet P on which an image has been formed is discharged is provided on an upper surface of the apparatus body 2. Four toner containers 5 that respectively store refill toner (developer) of four colors (magenta, cyan, yellow, and black) are detachably attached below the sheet discharge tray 4. It is noted that the medium is not limited to the paper sheet P formed of paper and may alternatively be a resin sheet or the like.

On the right-hand side inside the apparatus body 2, a conveying path 6 and an inverted conveying path 7 that are paths for conveying the paper sheet P are formed. The conveying path 6 is a path that is formed substantially in an S shape along an up-down direction and used for conveying the paper sheet P from the cassette 3 to the sheet discharge tray 4. The inverted conveying path 7 branches in a rightward direction on a downstream side of the conveying path 6 and extends downwardly, and joins the conveying path 6 on an upstream side. The inverted conveying path 7 is a path for inverting the paper sheet P and reconveying the paper sheet P to an imaging device 11 to be described later. It is noted that the terms "upstream and downstream" used in the present specification respectively mean "upstream and downstream" in a conveying direction of the paper sheet P (the medium).

A sheet feed device 10, the imaging device 11, a fixing device 12, and a control portion 13 are provided inside the apparatus body 2. The sheet feed device 10 is provided at an upstream end portion of the conveying path 6 and feeds the paper sheets P stored in the cassette 3 to the conveying path 6 while separating the paper sheets P one by one. The imaging device 11 is provided more on a downstream side than the sheet feed device 10, and the fixing device 12 is provided more on the downstream side than the imaging device 11. The fixing device 12 heats a toner image formed on the paper sheet P while pressurizing the toner image, and thus thermally fixes the toner image onto the paper sheet P. The control portion 13 collectively controls the image forming apparatus 1.

<Imaging Device>

The imaging device 11 includes an intermediate transfer belt 14, four drum units 15, and a laser scanning unit 16. The intermediate transfer belt 14 is provided below the toner containers 5, is bridged across a plurality of rollers, and rotates in a direction indicated by an arrow in FIG. 1. The four drum units 15 respectively correspond to the toner of four colors and are arranged next to one another in a left-right direction below the intermediate transfer belt 14. The laser scanning unit 16 is provided below the drum units 15. It is noted that since the four drum units 15 have the same structure, descriptions below will be given on one drum unit 15.

The drum unit 15 includes a photoconductor drum 20, a charging device 21, a developing device 22, a primary transfer roller 23, and a cleaning device 24. The photoconductor drum 20 rotates about a shaft while being in contact with a lower side of the intermediate transfer belt 14. The charging device 21, the developing device 22, the primary transfer roller 23, and the cleaning device 24 are arranged in a periphery of the photoconductor drum 20 in an order of image forming processes. The primary transfer roller 23 opposes the photoconductor drum 20 from an upper side with the intermediate transfer belt 14 interposed therebetween. A secondary transfer roller 25 comes into contact with a right-side end of the intermediate transfer belt 14 to form a transfer nip. A registration roller pair 26 is provided more on an upstream side than the secondary transfer roller 25.

<Control Portion>

The control portion 13 includes a storage portion which stores programs, data, and the like, an arithmetic processing portion which executes arithmetic processing according to the programs and the like, and a communication portion communicably connected to respective control targets (all of which are not shown). The storage portion, the arithmetic processing portion, and the communication portion are electrically connected to one another and are configured to be communicable with one another. The storage portion includes, for example, a storage medium such as a ROM (Read Only Memory) and a RAM (Random Access Memory), and the arithmetic processing portion includes, for example, a CPU (Central Processing Unit). It is noted that instead of the CPU, the control portion 13 may be realized by a logic circuit (hardware) formed in an integrated circuit or the like.

[Image Forming Processing]

Herein, operations of the image forming apparatus 1 will be described. For example, the control portion 13 executes image forming processing as follows based on image data input from an external terminal.

The charging device 21 charges a surface of the photoconductor drum 20. The laser scanning unit 16 exposes the photoconductor drum 20 and forms an electrostatic latent image corresponding to the image data on the surface of the photoconductor drum 20. The developing device 22 develops the electrostatic latent image formed on the photoconductor drum 20 into a toner image using toner supplied from the toner container 5. The toner images of four colors respectively carried by the four photoconductor drums 20 are primarily transferred in order onto the rotating intermediate transfer belt 14 by the primary transfer rollers 23 to which a primary transfer bias has been applied. The intermediate transfer belt 14 carries a full-color toner image obtained by superimposing the toner images of the four colors while rotating. The cleaning device 24 removes the toner remaining on the surface of the photoconductor drum 20 after the primary transfer.

The sheet feed device 10 picks up the paper sheet P stored in the cassette 3 and feeds the paper sheet P to the conveying path 6. The registration roller pair 26 feeds the paper sheet P that has been temporarily blocked to be subjected to skew correction toward the downstream side. The secondary transfer roller 25 to which a secondary transfer bias has been applied secondarily transfers the toner image formed on the intermediate transfer belt 14 onto a front surface of the paper sheet P that passes through the transfer nip. The fixing device 12 heats the toner image transferred onto the paper sheet P while pressurizing the toner image, and thus thermally fixes the toner image onto the paper sheet P. In the case of one-side printing, the paper sheet P onto which the toner image has been fixed (on which an image has been formed) is discharged onto the sheet discharge tray 4.

When performing duplex printing, the paper sheet P that has passed through the fixing device 12 is switched back at a downstream end portion of the conveying path 6 to be fed to the inverted conveying path 7. The paper sheet P conveyed on the inverted conveying path 7 enters the conveying path 6 again so that an image is also formed on a back surface of the paper sheet P by procedures similar to those of the one-side printing described.

[Fixing Device]

Figure 2:
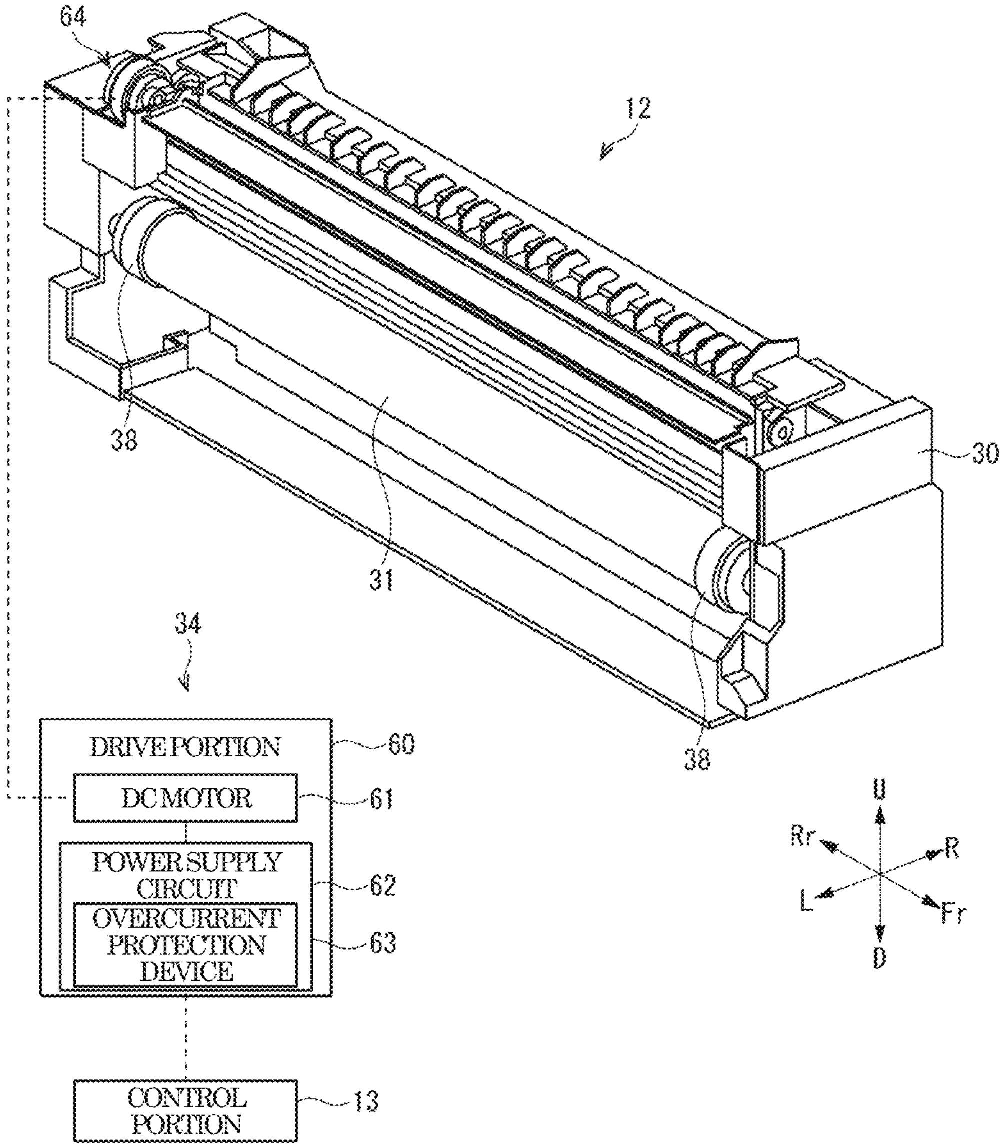
FIG. 2 is a perspective view showing a fixing device according to the embodiment of the present disclosure.
Figure 3:
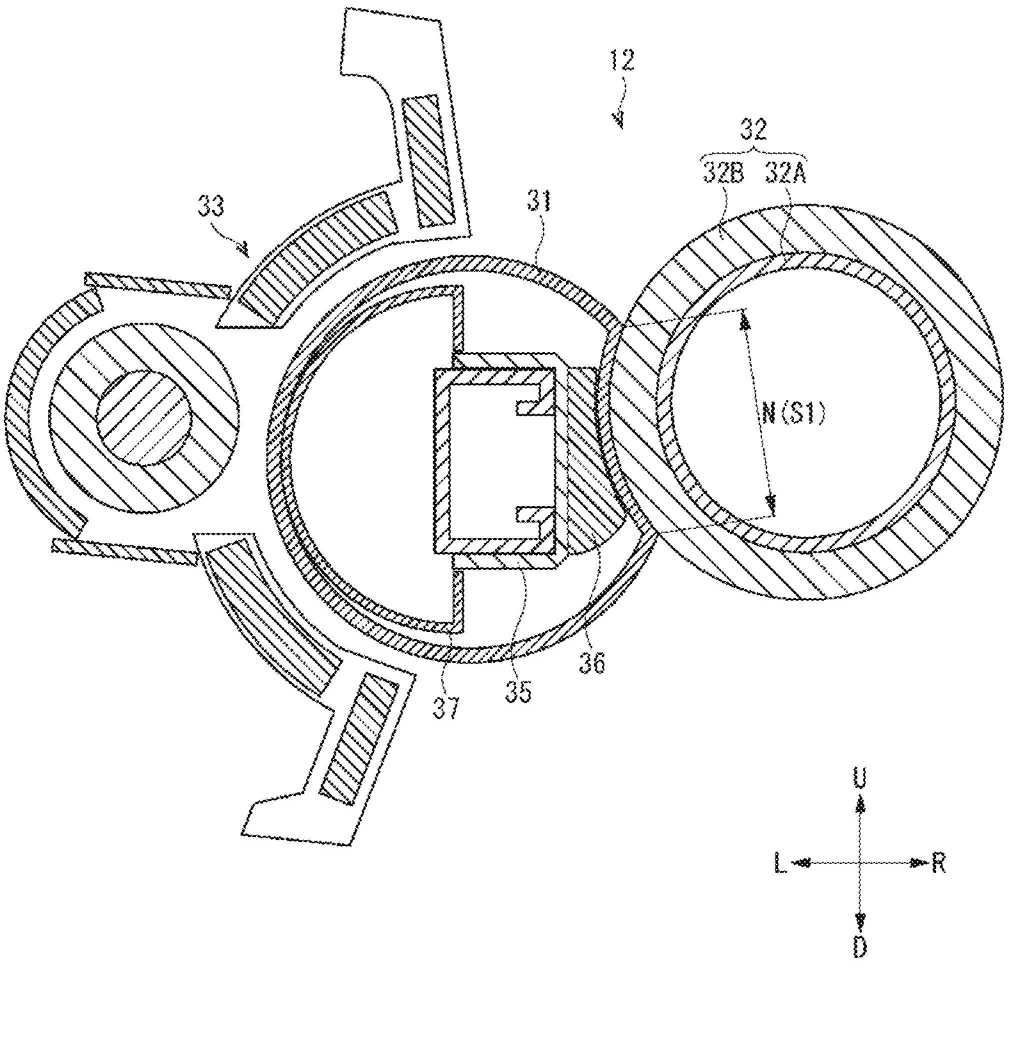
FIG. 3 is a cross-sectional view (a front view) showing the fixing device according to the embodiment of the present disclosure.
Figure 4:
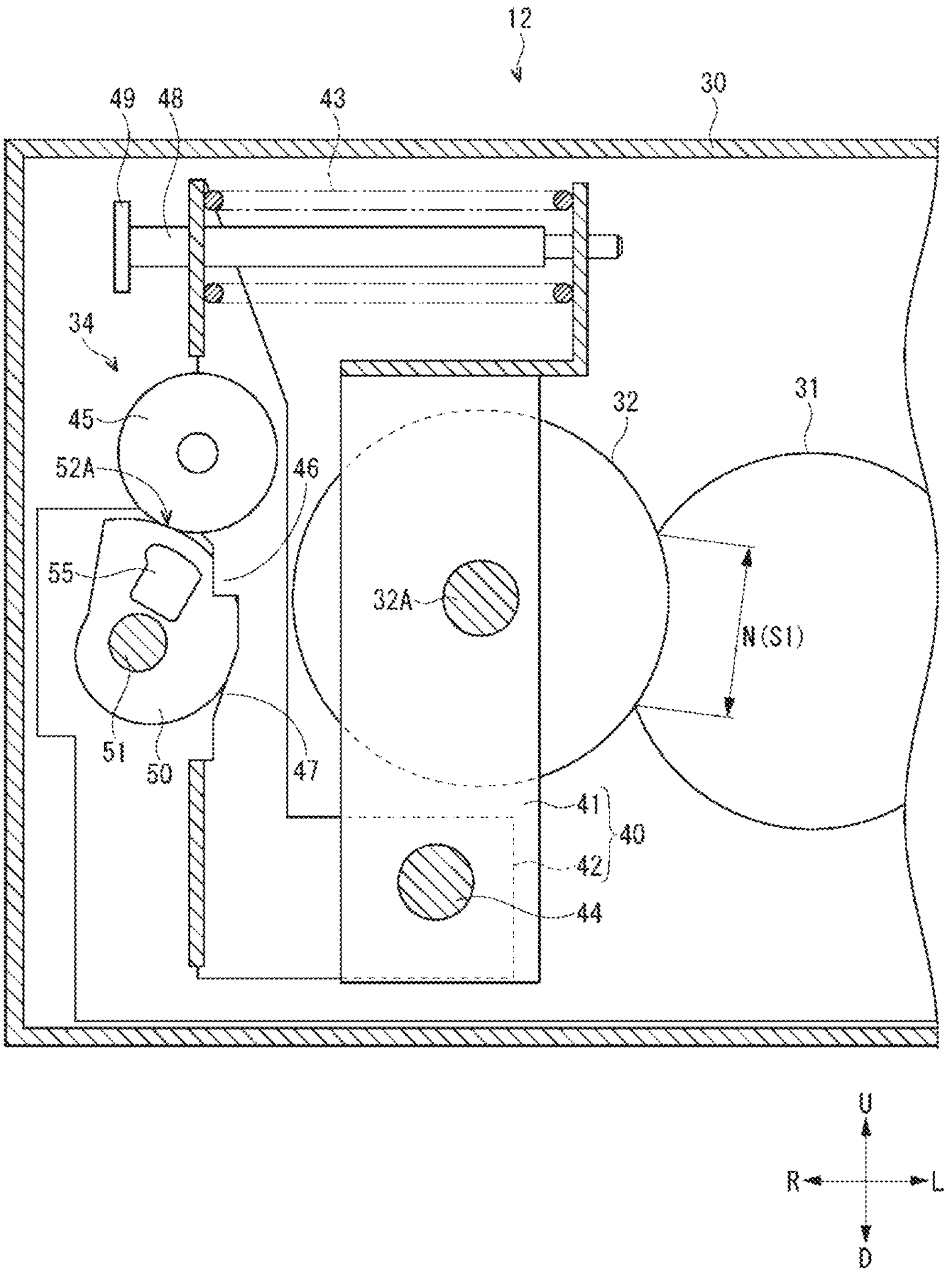
FIG. 4 is a cross-sectional view (a back view) showing a pressure changing portion and the like of the fixing device (in a pressurized state) according to the embodiment of the present disclosure.
Figure 5:
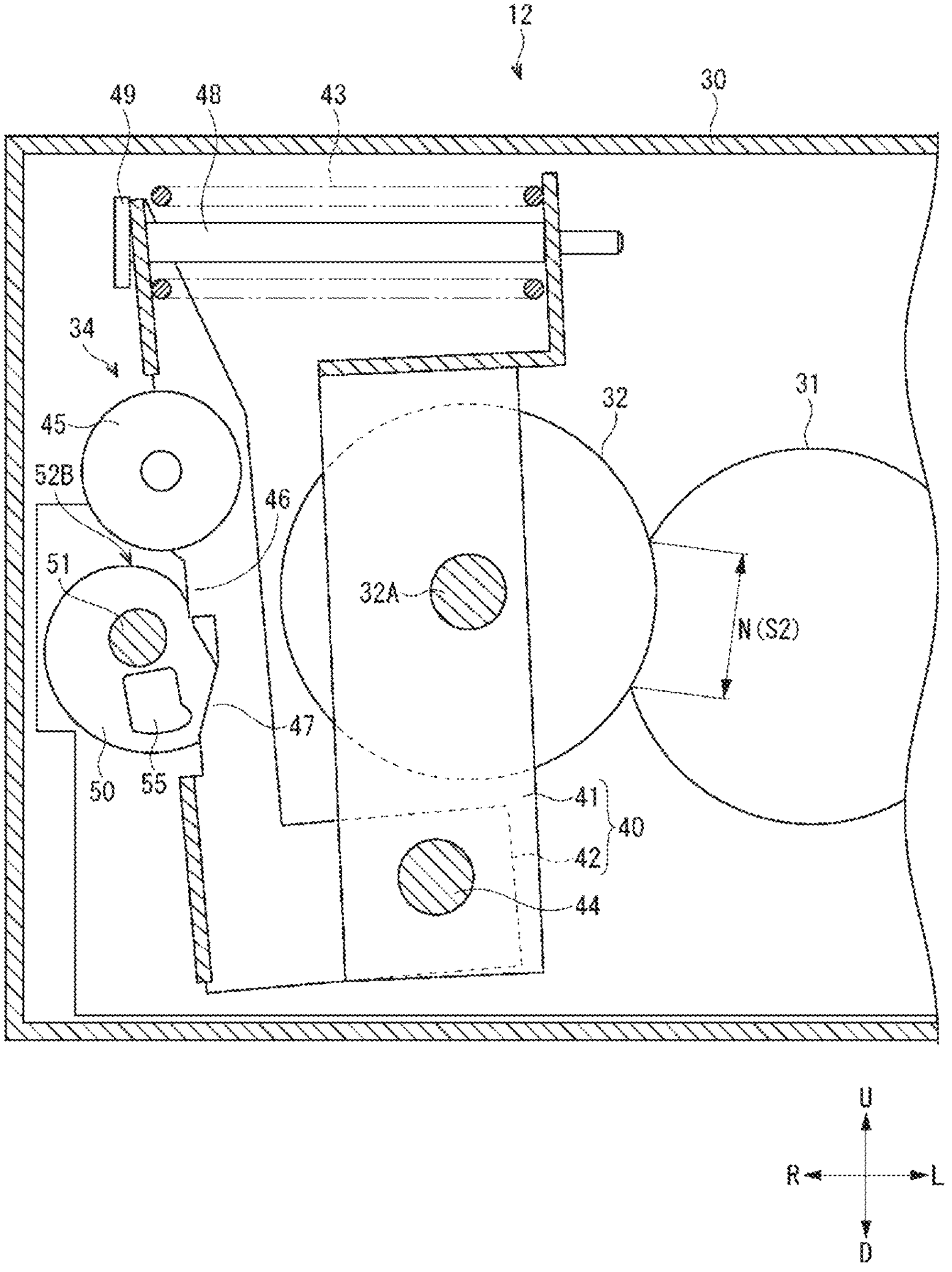
FIG. 5 is a cross-sectional view (a back view) showing the pressure changing portion and the like of the fixing device (in a depressurized state) according to the embodiment of the present disclosure.
Figure 6:
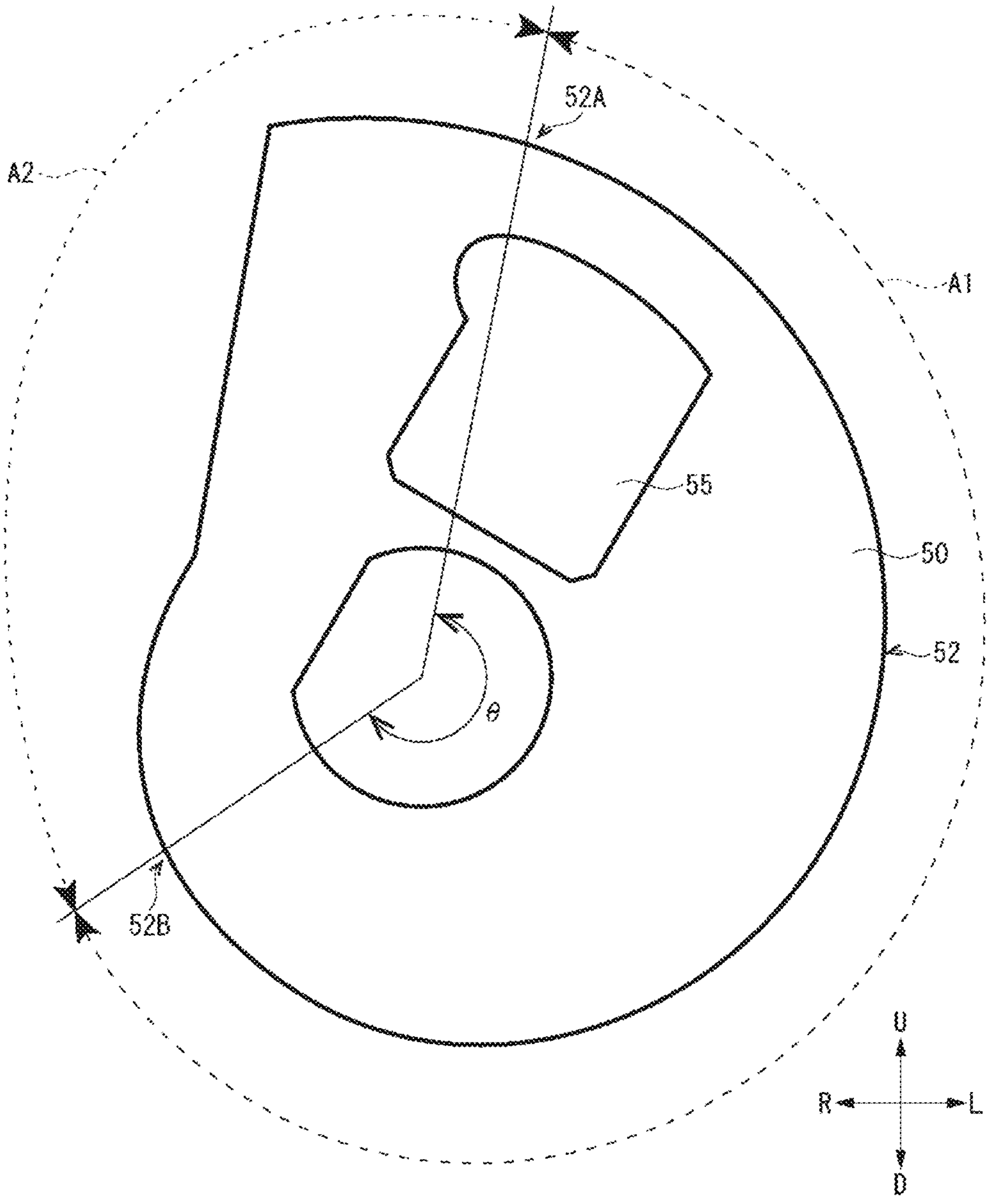
FIG. 6 is a back view showing an eccentric cam of the pressure changing portion in the fixing device according to the embodiment of the present disclosure.
Figure 7:
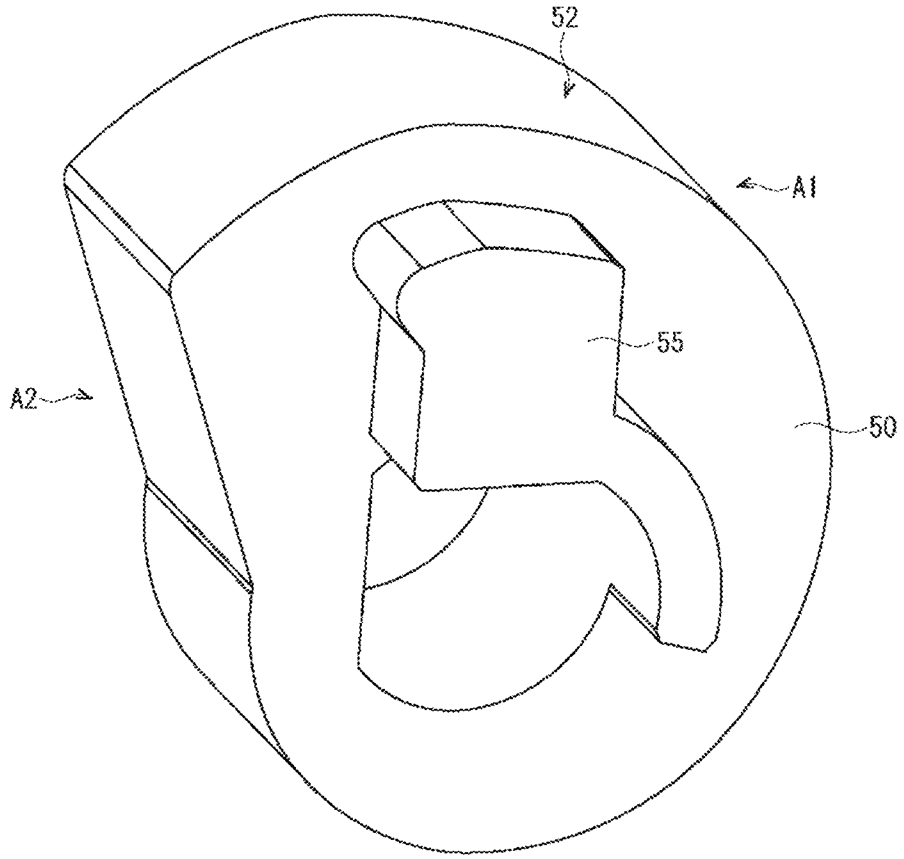
FIG. 7 is a perspective view showing the eccentric cam of the pressure changing portion in the fixing device according to the embodiment of the present disclosure.
Figure 8:
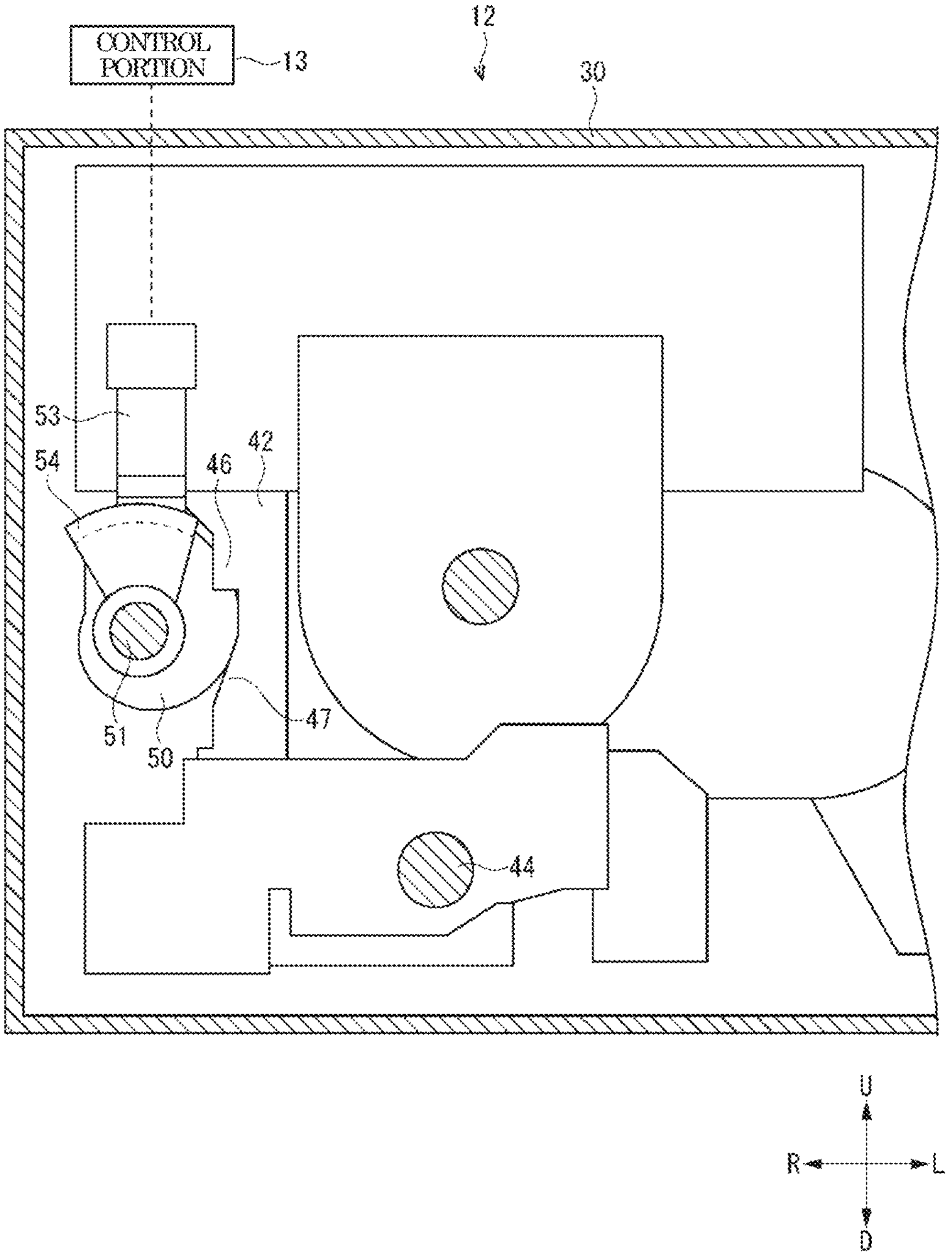
FIG. 8 is a cross-sectional view (a back view) showing a transmission-type optical sensor and the like of the pressure changing portion in the fixing device (in the pressurized state) according to the embodiment of the present disclosure.
Figure 9:
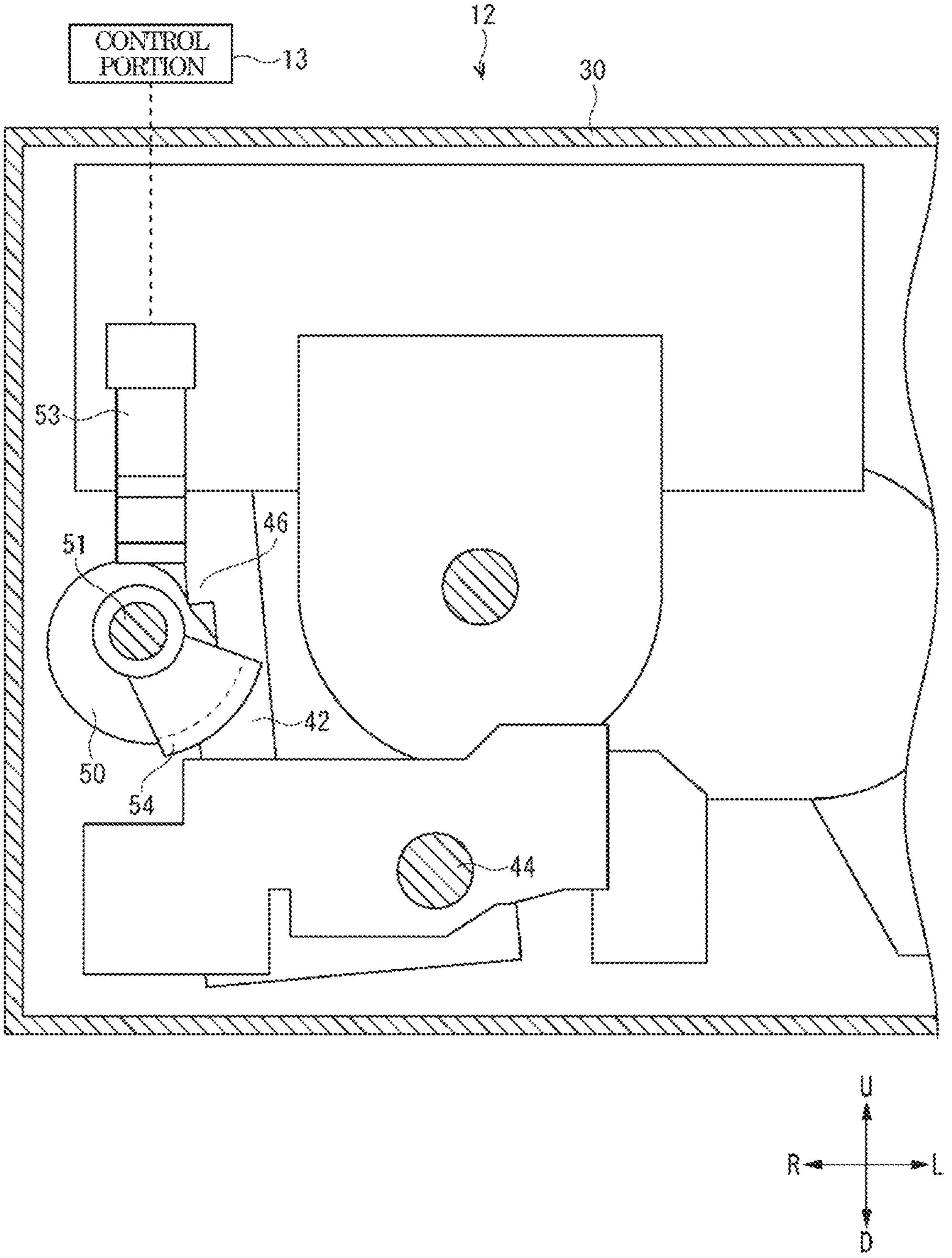
FIG. 9 is a cross-sectional view (a back view) showing the transmission-type optical sensor and the like of the pressure changing portion in the fixing device (in the depressurized state) according to the embodiment of the present disclosure.

Next, the fixing device 12 will be described with reference to FIG. 2 to FIG. 9. FIG. 2 is a perspective view showing the fixing device 12. FIG. 3 is a cross-sectional view (a front view) showing the fixing device 12. FIG. 4 is a cross-sectional view (a back view) showing a pressure changing portion 34 and the like of the fixing device 12 (in a pressurized state S1). FIG. 5 is a cross-sectional view (a back view) showing the pressure changing portion 34 and the like of the fixing device 12 (in a depressurized state S2). FIG. 6 is a back view showing an eccentric cam 50 of the pressure changing portion 34. FIG. 7 is a perspective view showing the eccentric cam 50 of the pressure changing portion 34. FIG. 8 is a cross-sectional view (a back view) showing a transmission-type optical sensor 53 and the like of the fixing device 12 (in the pressurized state S1). FIG. 9 is a cross-sectional view (a back view) showing the transmission-type optical sensor 53 and the like of the fixing device 12 (in the depressurized state S2).

As shown in FIG. 2 and FIG. 3, the fixing device 12 includes a fixing belt 31, a pressure roller 32, a heat generation portion 33, and the pressure changing portion 34.

<Fixing Belt>

The fixing belt 31 as an example of a fixing member is formed of a material obtained by laminating metal and a synthetic resin and has substantially a cylindrical shape elongated in a front-rear direction. As shown in FIG. 3, a belt support member 35, a pressing pad 36, and a belt guide 37 are provided inside the fixing belt 31. The belt support member 35 penetrates through the fixing belt 31 in an axial direction, and both end portions thereof are supported by a fixing frame 30 (see FIG. 2). The pressing pad 36 is formed of a synthetic resin having heat resistance, is fixed to the belt support member 35 at a position opposing the pressure roller 32, and is in contact with an inner surface of the fixing belt 31. The belt guide 37 is formed of metal and has substantially a semicylindrical shape elongated in the axial direction. The belt guide 37 is fixed to the belt support member 35 on an opposite side of the pressing pad 36 and comes into contact with the inner surface of the fixing belt 31 so as to maintain the fixing belt 31 in substantially the cylindrical shape. The fixing belt 31 is rotatably supported by the belt support member 35 via a pair of caps 38 attached to both end portions thereof on front and rear sides (see FIG. 2).

<Pressure Roller>

The pressure roller 32 as an example of a pressure member is formed substantially in a cylindrical shape elongated in the front-rear direction and is arranged on the right-hand side of the fixing belt 31. The pressure roller 32 is formed by, for example, laminating an elastic layer 32B formed of a synthetic resin on an outer circumferential surface of a core metal 32A formed of metal. Both end portions of the pressure roller 32 (the core metal 32A) on front and rear sides are rotatably supported by a pair of movable frames 41 (to be described later). The pressure roller 32 rotates about a shaft upon receiving a driving force of a motor (not shown) connected via a gear train or the like. The pressure roller 32 is pressed against the fixing belt 31 so as to form, between the fixing belt 31 and the pressure roller 32, a pressure region N where the paper sheet P is nipped and conveyed. It is noted that the pressure region N refers to a region from a position on the upstream side at which a pressure is 0 Pa to a position on the downstream side at which the pressures becomes 0 Pa again via a position at which the pressure becomes a maximum pressure. In addition, in the present embodiment, (a surface of) the pressure roller 32 is constantly in contact with (a surface of) the fixing belt 31.

<Heat Generation Portion>

The heat generation portion 33 is arranged on the left-hand side of the fixing belt 31 with a gap provided therebetween. The heat generation portion 33 is an induction-heating type heater which generates a magnetic field to cause the fixing belt 31 to perform self-heating. The belt guide 37 described above absorbs a leakage magnetic flux that has passed through the fixing belt 31 to perform self-heating, and assists heating of the fixing belt 31.

It is noted that the motor and the heat generation portion 33 that cause the pressure roller 32 to rotate are electrically connected to the control portion 13, a power supply circuit, and the like (not shown) and are controlled as appropriate by the control portion 13. Further, although the pressure roller 32 is rotationally driven and the fixing belt 31 is rotated by being driven in the present embodiment, the present disclosure is not limited thereto, and a configuration in which the fixing belt 31 is rotationally driven and the pressure roller 32 is rotated by being driven (not shown) is also possible. In addition, although the induction-heating type heat generation portion 33 is arranged outside the fixing belt 31 as a heat source, a halogen heater, a carbon heater, or the like may be arranged inside the fixing belt 31 or a heat generation resistance element that comes into contact with the inner surface of the fixing belt 31 may be arranged in place of the heat generation portion 33 (both of which are not shown).

<Pressure Changing Portion>

The pressure changing portion 34 is configured to be capable of making a switch between the pressurized state S1 where the pressure roller 32 is pressed against the fixing belt 31 to thus pressurize the pressure region N (see FIG. 4) and the depressurized state S2 where the pressing of the pressure roller 32 is released to thus depressurize the pressure region N (see FIG. 5). It is noted that the pressure region N is set to the pressurized state S1 during the image forming processing and is set to the depressurized state S2 during standby or the like. In addition, in the pressurized state S1, the fixing belt 31 is deformed due to the pressing by the pressure roller 32 and rotates by being driven by the pressure roller 32. Moreover, even in the depressurized state S2, the pressure roller 32 is in contact with the fixing belt 31.

As shown in FIG. 2 and FIG. 4, the pressure changing portion 34 includes a support portion 40, a pair of eccentric cams 50, a pair of restriction portions 55, a drive portion 60, and the control portion 13. It is noted that since the pair of eccentric cams 50 have substantially the same structure, descriptions will mainly be given on one (rear) eccentric cam 50 in the present specification. Similarly, descriptions will mainly be given on one (rear) restriction portion 55 in the present specification. In addition, the control portion 13 is a component included in the image forming apparatus 1 but is also a component of the pressure changing portion 34.

Alternatively, the pressure changing portion 34 may include a dedicated control portion (not shown) in place of the control portion 13 which collectively controls the image forming apparatus 1.

(Support Portion)

As shown in FIG. 4 and FIG. 5, the support portion 40 includes a pair of movable frames 41, a pair of pressing frames 42, and a pair of bias members 43. It is noted that since the pair of movable frames 41 have substantially the same structure, descriptions will mainly be given on one (rear) movable frame 41 in the present specification. Similarly, descriptions will mainly be given on one (rear) pressing frame 42 and one (rear) bias member 43 in the present specification.

(Movable Frame)

The pair of movable frames 41 are respectively arranged on both sides of the pressure roller 32 in the front-rear direction inside the fixing frame 30. The movable frame 41 is a plate having substantially a rectangular shape elongated in the up-down direction. The pair of movable frames 41 respectively support both end portions of the core metal 32A of the pressure roller 32 in the axial direction (the front-rear direction) such that the both end portions are rotatable about a shaft. The pressure roller 32 is supported at substantially a center portion of the movable frame 41 in the up-down direction. A lower portion of the movable frame 41 is supported by a support shaft portion 44 provided in the fixing frame 30, and the movable frame 41 swings about the support shaft portion 44 in the left-right direction (a reciprocating rotation).

(Pressing Frame)

The pair of pressing frames 42 are arranged on the right-hand side of the pair of movable frames 41 (the opposite side of the fixing belt 31). The pressing frame 42 is a plate that is bent substantially in an L shape. A lower portion of the pressing frame 42 is supported by the support shaft portion 44, and the pressing frame 42 swings about the support shaft portion 44 in the left-right direction (a reciprocating rotation). In addition, slightly on an upper side of the pressing frame 42, a cam follower 45 formed substantially in a disk shape (a cylindrical shape) is supported while being rotatable about a shaft.

(Bias Member)

The bias member 43 is, for example, a compression coil spring, and is stretched between an upper portion of the movable frame 41 and an upper portion of the pressing frame 42 (more on the upper side than the cam follower 45). A guide bar 48 fixed to the fixing frame 30 penetrates through the upper portions of the movable frame 41 and the pressing frame 42, and the bias member 43 is provided to be wound around the guide bar 48. A left end portion of the guide bar 48 is formed in a stepped bar shape, and a flange-like stopper 49 is provided at a right end of the guide bar 48. The bias member 43 presses the pressure roller 32 supported by the movable frame 41 against the fixing belt 31 using the pressing frame 42 as a pedestal. In addition, the bias member 43 presses the cam follower 45 provided in the pressing frame 42 against the eccentric cam 50 (to be described later) using the movable frame 41 as a pedestal.

(Eccentric Cam)

The pair of eccentric cams 50 are fixed on both sides of a cam shaft portion 51 provided in the fixing frame 30 in the front-rear direction. The cam shaft portion 51 is formed in a shape of a round bar extending in the front-rear direction on the right-hand side of the pressure roller 32 and is arranged substantially in parallel with the pressure roller 32. Both end portions of the cam shaft portion 51 in the front-rear direction are supported by the fixing frame 30 while being rotatable about a shaft. As shown in FIG. 6 and FIG. 7, the eccentric cam 50 is a so-called plate cam that is roughly formed in a shape of a comma-shaped gem and whose distance (radius) from a shaft center (of the cam shaft portion 51) to an outer circumferential surface 52 is non-uniform. As shown in FIG. 4 and FIG. 5, the eccentric cam 50 is arranged on a lower right-hand side of the cam follower 45 provided in the pressing frame 42 (the support portion 40), and the outer circumferential surface 52 thereof is in contact with (or opposes) an outer circumferential surface of the cam follower 45. Upon receiving a driving force of the drive portion 60, the eccentric cam 50 performs a reciprocating rotation about the shaft while the outer circumferential surface 52 thereof is in contact with or opposes the cam follower 45.

As shown in FIG. 6, the eccentric cam 50 includes a pressure surface portion 52A formed at one end portion of a reciprocating rotation range A1 on the outer circumferential surface 52 and a depressurization surface portion 52B formed at the other end portion of the reciprocating rotation range A1 on the outer circumferential surface 52. The pressure surface portion 52A is a portion of the outer circumferential surface 52 that basically corresponds to a maximum radius of the eccentric cam 50 and has a certain amount of range in a circumferential direction. The depressurization surface portion 52B is a portion of the outer circumferential surface 52 that basically corresponds to a minimum radius of the eccentric cam 50 and has a certain amount of range in the circumferential direction. An angle θ about a center of the reciprocating rotation range A1 is set to an angle exceeding 180 degrees (for example, 225 degrees). The reciprocating rotation range A1 is a rotation range of the eccentric cam 50 at a normal time and is a range of the outer circumferential surface 52 that comes into contact with or opposes the cam follower 45. In the reciprocating rotation range A1, the radius of the eccentric cam 50 gradually (continuously) increases from the depressurization surface portion 52B toward the pressure surface portion 52A. In other words, the outer circumferential surface 52 of the reciprocating rotation range A1 configures a smoothly curved surface. In the present embodiment, the pressure surface portion 52A is in contact with (the outer circumferential surface of) the cam follower 45 (see FIG. 4), and the depressurization surface portion 52B opposes (the outer circumferential surface of) the cam follower 45 with a gap provided therebetween (see FIG. 5). It is noted that the depressurization surface portion 52B may alternatively be configured to come into contact with the cam follower 45 (not shown).

In a range excluding the reciprocating rotation range A1 (hereinafter, will be referred to as a non-contact range A2; (180 degrees—angle θ)), the radius of the eccentric cam 50 changes drastically, and thus a step is formed on the outer circumferential surface 52. The non-contact range A2 is a range of the outer circumferential surface 52 that does not come into contact with or oppose the cam follower 45 during the normal time.

For example, when the eccentric cam 50 having the depressurization surface portion 52B opposing the cam follower 45 is rotated clockwise in FIG. 5, the pressing frame 42 rotates (is pushed) clockwise (in a direction in which it approaches the fixing belt 31) to thus compress the bias member 43 as shown in FIG. 4. The bias member 43 increases a force of pressing the movable frame 41 by being compressed, and presses the pressure roller 32 supported by the movable frame 41 against the fixing belt 31. The pressure surface portion 52A of the eccentric cam 50 comes into contact with the cam follower 45 to thus set the pressure region N to the pressurized state S1.

On the contrary, when the eccentric cam 50 having the pressure surface portion 52A in contact with the cam follower 45 is rotated counterclockwise in FIG. 4, the pressing frame 42 is biased by the bias member 43 to rotate counterclockwise (in a direction in which it moves away from the fixing belt 31) and is abutted against the stopper 49 of the guide bar 48 as shown in FIG. 5. As a result, the bias member 43 is extended (returns to substantially the natural length) so that the force of pressing the movable frame 41 is reduced and the pressing of the pressure roller 32 with respect to the fixing belt 31 is released. The depressurization surface portion 52B of the eccentric cam 50 opposes the cam follower 45 with a gap provided therebetween to thus set the pressure region N to the depressurized state S2. It is noted that although the pressure roller 32 is in contact with the fixing belt 31 even in the depressurized state S2, the pressure roller 32 may alternatively be configured to be separated from the surface of the fixing belt 31 (not shown).

As described heretofore, by the forward reverse rotations of the eccentric cam 50 and by the pressure surface portion 52A and the depressurization surface portion 52B selectively coming into contact with or opposing the cam follower 45, the support portion 40 moves within a range corresponding to the pressurized state S1 and the depressurized state S2. The support portion 40 (the movable frame 41 and the pressing frame 42) moves within a range of the guide bar 48.

It is noted that as shown in FIG. 8 and FIG. 9, the transmission-type optical sensor 53 is provided at a rear portion of the fixing frame 30, and a light shielding plate 54 formed substantially in a fan shape is fixed to a rear portion of the cam shaft portion 51. The light shielding plate 54 performs reciprocating rotations coaxially with the eccentric cam 50 and enters and leaves a space formed between a light-emitting portion and a light-receiving portion of the transmission-type optical sensor 53. The transmission-type optical sensor 53 is electrically connected to the control portion 13 and transmits light reception signals to the control portion 13. When the pressure surface portion 52A of the eccentric cam 50 comes into contact with the cam follower 45, the light shielding plate 54 is arranged between the light-emitting portion and the light-receiving portion to shield light emitted from the light-emitting portion (see FIG. 8). When the depressurization surface portion 52B of the eccentric cam 50 opposes the cam follower 45, the light shielding plate 54 leaves the space formed between the light-emitting portion and the light-receiving portion so that the light emitted from the light-emitting portion enters the light-receiving portion (see FIG. 9).

(Restriction Portion)

As shown in FIG. 6 and FIG. 7, the restriction portion 55 is provided in the eccentric cam 50. Specifically, the restriction portion 55 protrudes in the axial direction (the front-rear direction) from an end surface (a back surface) of the eccentric cam 50 where the radius roughly becomes the maximum radius. The restriction portion 55 is a protrusion that has substantially a block shape and is integrally formed with the eccentric cam 50. As shown in FIG. 4 and FIG. 5, the restriction portion 55 is provided to be capable of interfering with a part of the support portion 40 in a state where the pressure surface portion 52A or the depressurization surface portion 52B of the eccentric cam 50 is in contact with or opposes the cam follower 45. Specifically, the restriction portion 55 is provided to be capable of interfering with a pressure interference portion 46 or a depressurization interference portion 47 formed in the pressing frame 42. The pressure interference portion 46 is a part of the support portion 40 (the pressing frame 42) protruding in the rightward direction at a position below the cam follower 45. The depressurization interference portion 47 is a part of the support portion 40 (the pressing frame 42) that is positioned below the pressure interference portion 46 with an interval and is tilted upwardly from the right-hand side toward the left-hand side.

(Drive Portion)

As shown in FIG. 2, the drive portion 60 includes a DC motor 61, a power supply circuit 62, and an overcurrent protection device 63. The DC motor 61 is connected to one end portion (for example, a rear end portion) of the cam shaft portion 51 via a gear train 64. The DC motor 61 causes the eccentric cam 50 (the cam shaft portion 51) to perform reciprocating rotations. The power supply circuit 62 is electrically connected to the control portion 13, a power supply (not shown), and the like and controls power to be supplied to the DC motor 61. The overcurrent protection device 63 is mounted on the power supply circuit 62 and protects the power supply circuit 62 when a current of an allowable current or more (overcurrent) is caused in the power supply circuit 62.

[Fixing Processing]

Figure 10:
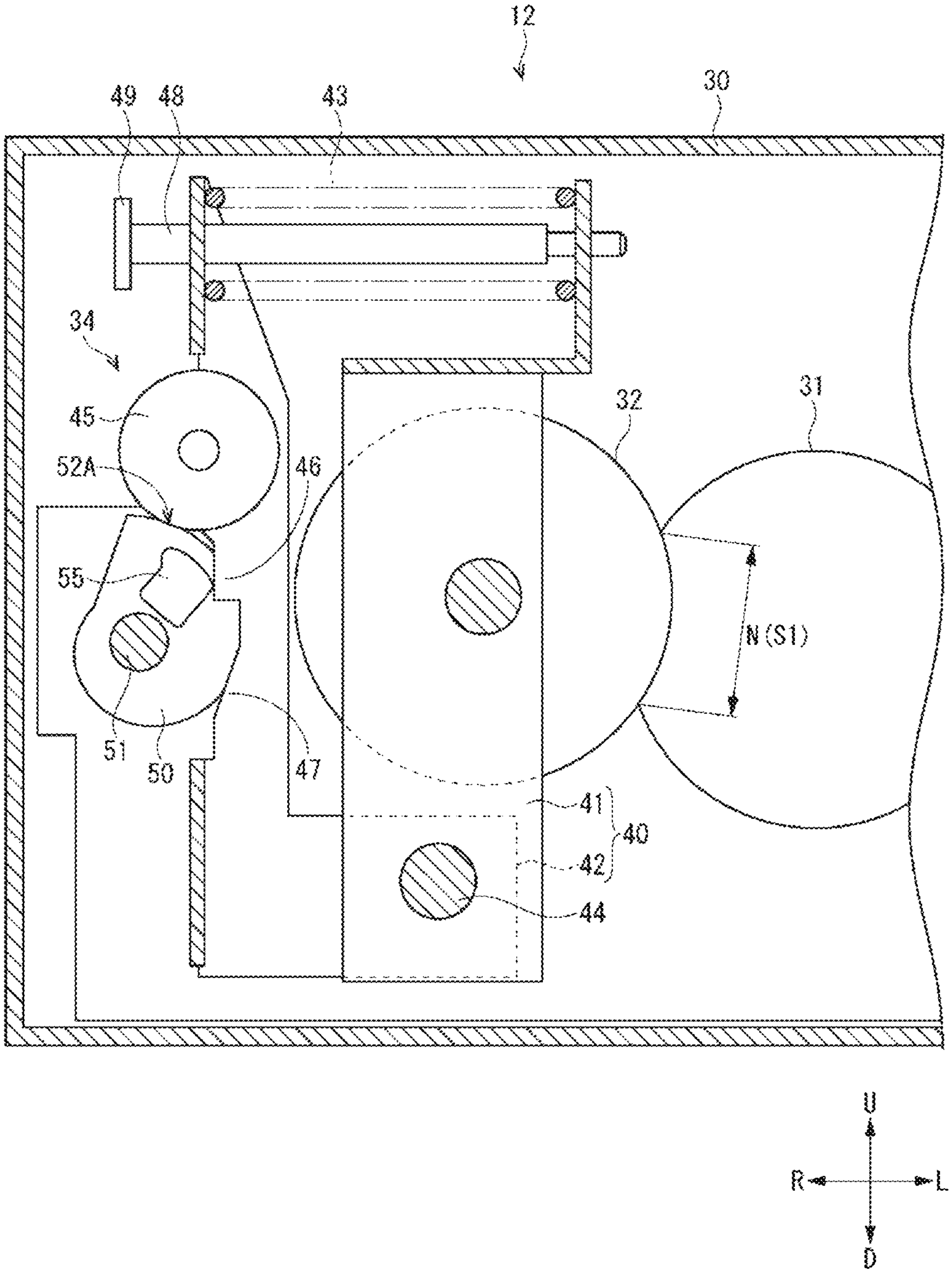
FIG. 10 is a cross-sectional view (a back view) for explaining an action of a restriction portion of the pressure changing portion in the fixing device (in the pressurized state) according to the embodiment of the present disclosure.
Figure 11:
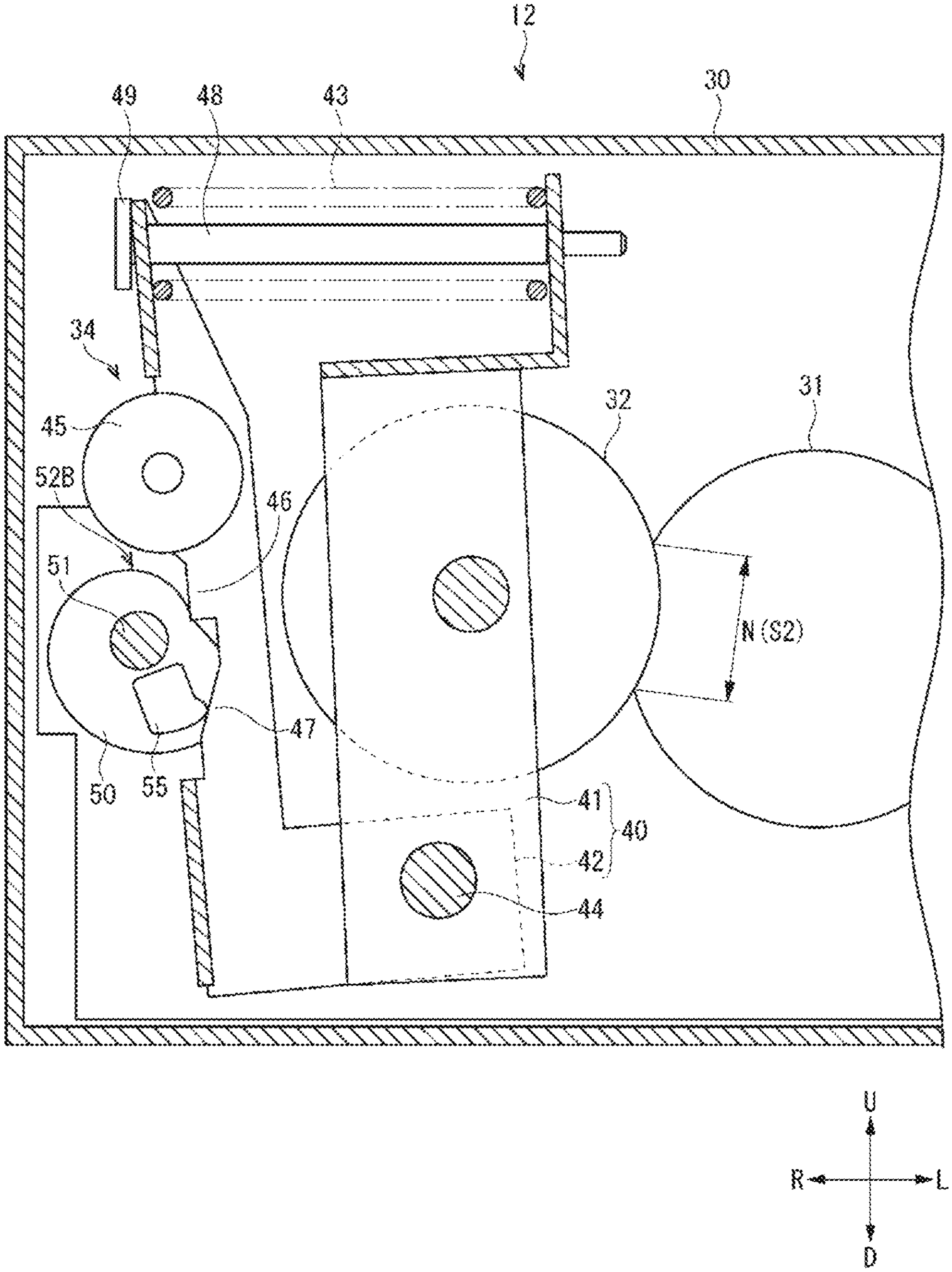
FIG. 11 is a cross-sectional view (a back view) for explaining the action of the restriction portion of the pressure changing portion in the fixing device (in the depressurized state) according to the embodiment of the present disclosure.

Herein, operations of the fixing device 12 will be described with reference to FIG. 4, FIG. 5, and FIG. 8 to FIG. 11. FIG. 10 is a cross-sectional view (a back view) for explaining an action of the restriction portion 55 of the fixing device 12 (in the pressurized state S1). FIG. 11 is a cross-sectional view (a back view) for explaining the action of the restriction portion 55 of the fixing device 12 (in the depressurized state S2).

The control portion 13 executes fixing processing while controlling the fixing device 12 as appropriate during the image forming processing described above. It is noted that before start (an initial state) of the image forming processing (the fixing processing), the pressure region N is set to the depressurized state S2. In other words, the depressurization surface portion 52B of the eccentric cam 50 opposes the cam follower 45, and the light shielding plate 54 has left the space formed between the light-emitting portion and the light-receiving portion (see FIG. 5 and FIG. 9). In the initial state, the restriction portion 55 is separated from the depressurization interference portion 47 (no interference (see FIG. 5)).

First, when the image forming processing (the fixing processing) is started, the drive portion 60 causes the cam shaft portion 51 (the eccentric cam 50 and the light shielding plate 54) to rotate clockwise in FIG. 5 and FIG. 9 under control of the control portion 13. The cam follower 45 moves relatively from the depressurization surface portion 52B to the pressure surface portion 52A (see FIG. 4), and the light shielding plate 54 enters the space formed between the light-emitting portion and the light-receiving portion of the transmission-type optical sensor 53 (see FIG. 8). The transmission-type optical sensor 53 transmits light reception information that indicates that the light from the light-emitting portion has been shielded by the light shielding plate 54 to the control portion 13, and the control portion 13 stops the drive of the drive portion 60 based on the received light reception information. Thus, the pressure surface portion 52A is retained in a state where the pressure surface portion 52A is in contact with the cam follower 45, and the pressure region N is set to the pressurized state S1 (see FIG.

4). It is noted that in this state, the restriction portion 55 is separated from the pressure interference portion 46 (no interference (see FIG. 4)).

Subsequently, the control portion 13 drives the heat generation portion 33, the motor, and the like and starts the image forming processing already described above. The heat generation portion 33 heats the fixing belt 31. The fixing belt 31 heats a toner image formed on the paper sheet P that passes through the pressure region N while rotating about the shaft. The pressure roller 32 pressurizes the toner on the paper sheet P that passes through the pressure region N while rotating about the shaft. During a process in which the paper sheet P passes through the pressure region N, the toner image formed on the paper sheet P is melted and fixed to the paper sheet P.

When the image forming processing (the fixing processing) is ended, the drive portion 60 causes the cam shaft portion 51 (the eccentric cam 50 and the light shielding plate 54) to rotate counterclockwise in FIG. 4 and FIG. 8 under control of the control portion 13. The cam follower 45 moves relatively from the pressure surface portion 52A until opposing the depressurization surface portion 52B (see FIG. 5), and the light shielding plate 54 leaves the space formed between the light-emitting portion and the light-receiving portion of the transmission-type optical sensor 53 (see FIG. 9). The transmission-type optical sensor 53 transmits light reception information that indicates that the light from the light-emitting portion has been received by the light-receiving portion to the control portion 13, and the control portion 13 stops the drive of the drive portion 60 after an elapse of a predetermined time since the reception of the light reception information. Thus, the depressurization surface portion 52B is retained in a state where the depressurization surface portion 52B opposes the cam follower 45, and the pressure region N is set to the depressurized state S2 (see FIG. 5). It is noted that also when the paper sheet P is jammed in the pressure region N or the like, the pressure changing portion 34 sets the pressure region N to the depressurized state S2. Thus, the jammed paper sheet P can be removed with ease.

Incidentally, there is a fear that, when the transmission-type optical sensor 53 does not function normally due to a failure or the like, the drive portion 60 will not be stopped and a contact position between the outer circumferential surface 52 of the eccentric cam 50 and the cam follower 45 will be deviated. For example, when the eccentric cam 50 rotates excessively and the cam follower 45 relatively passes beyond the pressure surface portion 52A or the depressurization surface portion 52B, the cam follower 45 drops to the non-contact range A2 that is not originally made to come into contact therewith. As a result, the eccentric cam 50 is set to a locked state where the eccentric cam 50 cannot rotate and thus needs to be restored by disassembling the fixing device 12 or the like.

In this regard, in the fixing device 12 according to the present embodiment, the restriction portion 55 restricts a rotation of the eccentric cam 50 exceeding the reciprocating rotation range A1. Specifically, as shown in FIG. 10, the restriction portion 55 interferes with (is abutted against) the pressure interference portion 46 in a state where the pressure surface portion 52A of the eccentric cam 50 is in contact with the cam follower 45, to thus restrict the (clockwise) rotation of the eccentric cam 50 toward one side of the reciprocating rotation range A1 (the non-contact range A2). In addition, as shown in FIG. 11, the restriction portion 55 interferes with (is abutted against) the depressurization interference portion 47 in a state where the depressurization surface portion 52B of the eccentric cam 50 opposes the cam follower 45, to thus restrict the (counterclockwise) rotation of the eccentric cam 50 toward the other side of the reciprocating rotation range A1 (the non-contact range A2). With this configuration, since the restriction portion 55 physically interferes with a part of the support portion 40 (the pressing frame 42), it is possible to prevent the eccentric cam 50 from rotating excessively as in a case where the cam follower 45 relatively passes beyond the pressure surface portion 52A or the depressurization surface portion 52B. Thus, it is possible to effectively prevent the eccentric cam 50 from being set to the locked state where the eccentric cam 50 cannot rotate.

Further, when the drive portion 60 is continued to be driven in a state where the restriction portion 55 is interfering with a part of the support portion 40, an overcurrent occurs in the power supply circuit 62 of the drive portion 60. When an overcurrent continues to flow in the power supply circuit 62, there is a fear that an excessive load will be applied to the power supply circuit 62 to thus damage the power supply circuit 62 and the like.

In this regard, in the fixing device 12 according to the present embodiment, when an overcurrent occurs in the drive portion 60 (the power supply circuit 62) in the state where the restriction portion 55 is interfering with a part of the support portion 40, the drive portion 60 (the DC motor 61) is stopped. Specifically, when an overcurrent occurs in the power supply circuit 62, a resistance value of the overcurrent protection device 63 (see FIG. 2) rises precipitously and supply of power to the DC motor 61 is blocked, and thus the DC motor 61 is stopped. With this configuration, even if a failure occurs in the transmission-type optical sensor 53, the drive portion 60 can be stopped upon detecting an overcurrent in the drive portion 60. Thus, an inconvenience that an excessive load is applied to the drive portion 60 to damage the power supply circuit 62, or the like can be suppressed.

It is noted that in the fixing device 12 according to the present embodiment, the support portion 40 is configured by connecting the movable frame 41 and the pressing frame 42 by the bias member 43, but the present disclosure is not limited thereto. For example, the pressing frame 42 and the bias member 43 may be omitted, and the support portion 40 may be configured by the movable frame 41 alone. In this case, it is favorable to provide the cam follower 45, the pressure interference portion 46, and the depressurization interference portion 47 in the movable frame 41 and provide a spring or the like for pressing the movable frame 41 (the cam follower 45) against the eccentric cam 50 (not shown).

Further, in the fixing device 12 according to the present embodiment, the support portion 40 (the pair of movable frames 41) rotatably supports the pressure roller 32, but the present disclosure is not limited thereto. For example, the support portion 40 (the pair of movable frames 41) may rotatably support the fixing belt 31. In other words, the pressure changing portion 34 may alternatively be configured to be capable of making a switch between the pressurized state S1 where the fixing belt 31 is pressed against the pressure roller 32 and the depressurized state S2 where the pressing of the fixing belt 31 is released (not shown).

Furthermore, in the fixing device 12 according to the present embodiment, the eccentric cam 50 (the cam shaft portion 51) is arranged on the opposite side of the pressure roller 32 (the right-hand side of the pressing frame 42 in FIG. 4) with the support portion 40 interposed therebetween, the pressure surface portion 52A corresponds to substantially the maximum radius of the eccentric cam 50, and the depressurization surface portion 52B corresponds to substantially the minimum radius of the eccentric cam 50, but the present disclosure is not limited thereto. For example, the eccentric cam 50 (the cam shaft portion 51) may be arranged between the movable frame 41 and the pressing frame 42 so as to come into contact with or oppose the cam follower 45 from the left-hand side of the pressing frame 42 in FIG. 4 (not shown). In this case, the pressure surface portion 52A corresponds to substantially the minimum radius of the eccentric cam 50, and the depressurization surface portion 52B corresponds to substantially the maximum radius of the eccentric cam 50 (not shown). In this case, the pressure surface portion 52A may come into contact with the cam follower 45 or oppose the cam follower 45 with a gap provided therebetween (not shown). The depressurization surface portion 52B comes into contact with the cam follower 45. Further, in this case, the bias member 43 may be an extension coil spring so as to press the cam follower 45 against the eccentric cam 50.

Further, in the fixing device 12 according to the present embodiment, the reciprocating rotation range A1 (the angle θ) of the eccentric cam 50 is an angle exceeding 180 degrees, but the present disclosure is not limited thereto, and the reciprocating rotation range A1 may be set to be 90 degrees or more and 180 degrees or less (not shown).

Furthermore, in the fixing device 12 according to the present embodiment, the transmission-type optical sensor 53 is configured to detect a rotation angle of the eccentric cam 50, but the present disclosure is not limited thereto. For example, a reflective optical sensor and a reflector plate may be adopted or a microswitch and a member which presses the microswitch may be adopted in place of the transmission-type optical sensor 53 and the light shielding plate 54 (both of which are not shown).

Moreover, in the fixing device 12 according to the present embodiment, the restriction portion 55 is formed integrally with the eccentric cam 50, but the present disclosure is not limited thereto. For example, the restriction portion 55 may be manufactured as a member different from the eccentric cam 50 and fixed to a side surface of the eccentric cam 50 by means of bonding, screwing, and the like (not shown).

Further, in the fixing device 12 according to the present embodiment, one restriction portion 55 interferes with both the pressure interference portion 46 and the depressurization interference portion 47, but the present disclosure is not limited thereto. For example, two restriction portions 55 may be provided on the side surface of the eccentric cam 50 so as to correspond to the two interference portions 46 and 47 (not shown). In other words, a first restriction portion that interferes with the pressure interference portion 46 in a state where the pressure surface portion 52A is in contact with the cam follower 45 and a second restriction portion that interferes with the depressurization interference portion 47 in a state where the depressurization surface portion 52B is in contact with the cam follower 45 may be provided on the side surface of the eccentric cam 50 (both of which are not shown).

Furthermore, in the fixing device 12 according to the present embodiment, the DC motor 61 of the drive portion 60 causes the eccentric cam 50 to rotate, but the present disclosure is not limited thereto, and a motor capable of controlling an angle such as a stepping motor may be adopted in place of the DC motor 61. In this case, the transmission-type optical sensor 53 or the like becomes unnecessary.

Moreover, in the fixing device 12 according to the present embodiment, the fixing belt 31 is adopted as an example of the fixing member, but the present disclosure is not limited thereto, and a roller member similar to the pressure roller 32 may be adopted (not shown). In addition, the pressure roller 32 is adopted as an example of the pressure member, but the present disclosure is not limited thereto, and a belt member similar to the fixing belt 31 may be adopted (not shown).

Further, the image forming apparatus 1 according to the present embodiment is a color printer, but the present disclosure is not limited thereto, and the present disclosure may be applied to, for example, a monochrome printer, a copying machine, a facsimile, a multifunction peripheral, or the like.

It is noted that the descriptions on the embodiment above is given on one aspect of the fixing device and image forming apparatus according to the present disclosure, and the technical scope of the present disclosure is not limited to the embodiment described above. The present disclosure may be variously changed, substituted, and modified without departing from the gist of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A fixing device, comprising:

a fixing member which heats toner on a medium while rotating about a shaft;

a pressure member which forms a pressure region between the pressure member and the fixing member while rotating about a shaft and pressurizes the toner on the medium that passes through the pressure region; and a pressure changing portion configured to be capable of making a switch between a pressurized state where either one of the fixing member and the pressure member is pressed against another one of the fixing member and the pressure member to pressurize the pressure region and a depressurized state where the pressing of the either one of the fixing member and the pressure member is released to depressurize the pressure region, wherein the pressure changing portion includes:

a support portion which rotatably supports either one of the fixing member and the pressure member and moves within a range corresponding to the pressurized state and the depressurized state;

an eccentric cam which performs a reciprocating rotation about a shaft while an outer circumferential surface thereof is in contact with or opposes a cam follower provided in the support portion; and a restriction portion which is provided protruding from a side surface orthogonal to the shaft of the eccentric cam in the eccentric cam and restricts a rotation exceeding a reciprocating rotation range of the eccentric cam by coming into contact with the support portion, the eccentric cam includes:

a pressure surface portion which is formed at an end portion on one side of the reciprocating rotation range on the outer circumferential surface and sets the pressure region to the pressurized state; and a depressurization surface portion which is formed at an end portion on another side of the reciprocating rotation range on the outer circumferential surface and sets the pressure region to the depressurized state, and the restriction portion interferes with a part of the support portion in a state where the pressure surface portion is in contact with or opposes the cam follower to restrict a rotation of the eccentric cam toward the one side of the reciprocating rotation range, and interferes with a part of the support portion in a state where the depressurization surface portion is in contact with or opposes the cam follower to restrict a rotation of the eccentric cam toward the another side of the reciprocating rotation range.

2. The fixing device according to claim 1, wherein the pressure changing portion further includes a drive portion which causes the eccentric cam to perform the reciprocating rotation, and the drive portion is stopped when an overcurrent occurs in the drive portion in a state where the restriction portion is interfering with the part of the support portion.

3. The fixing device according to claim 2, further comprising:

a sensor which detects a contact of the pressure surface portion with the cam follower, wherein the drive portion is controlled on a basis of a signal output from the sensor.

4. The fixing device according to claim 3, wherein the sensor is a transmission-type optical sensor, and the eccentric cam includes a light shielding plate which shields light of the sensor in a case where the pressure surface portion and the cam follower come into contact with each other.

5. An image forming apparatus, comprising the fixing device according to claim 1.

6. The fixing device according to claim 1, wherein the support portion includes:

a movable frame which is supported by a support shaft portion to be swingable and supports either one of the fixing member and the pressure member to be rotatable;

a bias member which biases, more on an upstream side than the movable frame in a specific direction toward the pressure region of swinging directions of the movable frame, the movable frame in the specific direction; and a pressure frame which is supported by the support shaft portion to be swingable and supports the bias member more on an upstream side in the specific direction than the bias member, the cam follower is provided in the pressure frame, and the eccentric cam is provided more on an upstream side in the specific direction than the cam follower.

7. The fixing device according to claim 6, wherein the bias member is a compression coil spring.

* * * * *